Patented Aug. 19, 1941  2,252,728

UNITED STATES PATENT OFFICE 2,252,728

CHLORINATED RUBBER AND A METHOD FOR ITS PRODUCTION

John Merriam Peterson, Kennett Square, Pa., assignor to Hercules Powder Company, Wilmington, Del., a corporation of Delaware No Drawing. Application June 22, 1938,
Serial No. 215,215

7 Claims. (Cl. 260—772)

This invention relates to an improved chlorinated rubber and to a method for its production. More particularly, it relates to a chlorinated rubber characterized by a decreased color and by an improved and permanent flexibility.

Heretofore it has been known to produce chlorinated rubber by the direct reaction of chlorine with rubber and it has been found that a chlorinated rubber of about 60 to about 68 per cent chlorine content is of the greatest commercial value. It is a well-known fact that films of such chlorinated rubber have relatively poor flexibility when first made and the flexibility becomes very much poorer as the films age. Attempts have been made to increase the flexibility of chlorinated rubber films by adding plasticizers. However, addition of plasticizers has not been very successful, chiefly because the mixture usually becomes too soft with increasing amounts of the usual plasticizers before the desired improvement in flexibility of the film is obtained. Furthermore, the use of plasticizers does not provide lasting flexibility, and in many cases decreases the chemical resistivity of the film.

Now, I have found that I can produce a chlorinated rubber which possesses much greater flexibility in films than ordinary chlorinated rubber and which has the very valuable property of retaining and even improving its original high flexibility after long periods of aging. Heretofore it has not been possible to produce chlorinated rubber films of high flexibility without plasticizing, such plasticized films having the disadvantages related above.

In addition to the improved flexibility, the chlorinated rubber which I produce in accordance with my invention has less color than ordinary chlorinated rubber. Whereas ordinary chlorinated rubber will have a color of about 4.5 Hellige in a 20 per cent solution in toluene, my improved chlorinated rubber will have a color usually not darker than 2.5 Hellige. This improvement in color is valuable in many uses of chlorinated rubber.

Also, the chlorinated rubber which I produce in accordance with my invention is more stable chemically than ordinary chlorinated rubber, undergoing hydrochloric acid evolution much less readily. It also discolors much less than ordinary chlorinated rubber under the influence of light and heat.

I have found it possible to produce a chlorinated rubber having high flexibility in films and decreased color by digesting natural rubber at elevated temperatures and pressures with dilute aqueous alkaline solution, washing the digested rubber to remove soluble digestion products and the reagents used, then drying the digested rubber, dissolving the dried, digested rubber in a suitable solvent and chlorinating to a chlorine content of about 62 to about 70 per cent.

The improvement in film flexibility of the chlorinated rubber produced in accordance with my invention over ordinary chlorinated rubber is clearly demonstrated below in Table I which contains flexibility data, expressed in Schopper folding values, of films of my improved chlorinated rubber and ordinary chlorinated natural rubber. Values for fresh films and films which have aged up to 26 months demonstrate that my improved chlorinated rubber produces films which actually increase in flexibility on aging, whereas ordinary chlorinated rubber films either have no original flexibility, as measured by Schopper folds, or they lose their flexibility on aging for relatively short periods. The films shown in Table I are all of 3 mils thickness.

Table I

|  | Schopper folds | | | | | | |
|---|---|---|---|---|---|---|---|
| Time in months | 0 | 3 | 4 | 6 | 9 | 21 | 26 |
| Ordinary chlorinated rubber: | | | | | | | |
| 125 centipoise type | 0 | | | | | | |
| 1,000 centipoise type | 0 | | | | | | 0 |
| 5,000 centipoise type | 11 | 0 | | | | | |
| Chlorinated digested rubber: | | | | | | | |
| 125 centipoise type | 3 | | | | | 4.3 | 6.7 |
| 1,150 centipoise type | 6 | | 11 | | | | 24 |
| 2,800 centipoise type | 6 | 7 | | 12 | | | |

The rubber which I prefer to use in practice of my invention will be in a form which is easily penetrated by the digestion liquor. For example, I may use slices of thin-sheet crepe rubber which comes on the market in blades. I may also use smoked sheet rubber which is available in densely packed bales. In the latter form, however, it is preferable to reduce the rubber to thin sheets. I may also use natural or preserved latex, artificial dispersions of rubber, etc. In certain cases, cheaper, lower grades of rubber, or vulcanized rubber, may be used to advantage, since my digestion treatment in these cases simultaneously eliminates objectionable impurities found in these lower grades of rubber.

In my digestion treatment of the rubber I may use a dilute aqueous solution of, for example, sodium hydroxide, potassium hydroxide, sodium carbonate, potassium carbonate, etc.

In this digestion treatment, the concentration of the aqueous alkaline solution, the time of treatment and the temperature of treatment are interrelated variables, and each must be taken into account to secure a fully successful treatment. I prefer to use a concentration within the range of about 2 to about 15 per cent, a temperature wthin the range of about 140° C. to about 235° C. and a time within the range of about one to about 8 hours. Although I find it impossible to set up a general expression for the relationship between the three variables, I will exemplify a number of specific conditions, based upon the use of caustic soda, which I find satisfactory in my treatment, as follows:

| Time | Concentration of caustic soda | Temperature |
|---|---|---|
| | Percent | ° C. |
| 1 hour | 2 | 231 |
| 2 hours | 5 | 231 |
| 3.5 hours | 2 | 192 |
| 8 hours | 2 | 150 |

As a limiting point in the digestion, I prefer to interrupt the digestion process so as to give a digested rubber which after subsequent washing will have a viscosity in a 5 per cent carbon tetrachloride solution at 20° C. of about 20 to about 200 seconds Cochius, the Cochius viscosity being defined as the time required for an air bubble 1 cm. long to ascend through 50 cm. of the solution in a tube 7 mm. in diameter at a temperature of 20° C.

The digestion treatment which I employ produces a change in the rubber which makes it possible to obtain on chlorination of the digested rubber the decreased color and the improved and permanent flexibility which characterize my improved chlorinated rubber. Although deproteinization occurs during my digestion treatment, the decreased nitrogen content does not appear to be correlated with the improved flexibility of the chlorinated rubber. For example, a rubber digested by my process with 2 per cent caustic soda solution at 231° C. for one hour had a nitrogen content of 0.015 per cent. On chlorination it gave a chlorinated rubber which in a film of 3 mils thickness had a Schopper fold value of 3 to 4 folds. Another rubber, digested by my process with 2 per cent caustic soda solution at 150° C. for eight hours had a nitrogen content of 0.15 per cent, or in other words, ten times as much as the first rubber. However, on chlorination it produced a chlorinated rubber having approximately the same flexibility, namely 2 to 3 folds in the Schopper test. Thus, it does not appear that my improvement in flexibility is directly related with deproteinization of the rubber.

On completion of the digestion, I wash the digested rubber with water to remove soluble digestion products and reagents. I find it is not necessary to wash the rubber entirely free of alkali, inasmuch as the presence of as much as 0.5 per cent alkali in the rubber does not prevent the production of chlorinated rubber of high flexibility. The washing may be carried out by any suitable means. I prefer to carry out the washing in a mechanical rubber washer.

After washing the digested rubber, I dry it, preferably by rolling on hot surfaces. The same mechanical rubber washer may be used for the drying operation by heating the rolls and walls of the vessel with steam.

The digested rubber, washed and dried as described above, will be clear amber in color and will be soft and tacky to nearly fluid at ordinary temperatures. A 5 per cent solution in carbon tetrachloride will have a viscosity at 20° C. of about 20 to about 200 seconds Cochius and preferably about 50 to about 130 seconds Cochius. It will be reduced in viscosity to a degree below that of useful mechanical properties.

The digested rubber having the above characteristics is then dissolved in a solvent such as for example, carbon tetrachloride, tetrachloroethane, ethylene dichloride, chloroform, benzene and chlorination carried out by passing chlorine through the solution to give a chlorinated product containing about 62 to about 70 per cent chlorine, and then recovering the chlorinated product by a suitable method such as precipitation, solvent evaporation, etc.

The flexibility of films of the chlorinated digested rubber varies with the viscosity. The viscosity is determined in a Hercules capillary tube on a 20 per cent solution of chlorinated rubber in toluene at a temperature of 25° C. In a 1000 centipoise type my improved chlorinated rubber will have a flexibility in a film of 3 mils thickness represented by about 15 folds in the Schopper fold tester. In a 125 centipoise type it will show about 4 to 8 folds. After long periods of aging the films show an equal or higher Schopper fold value as compared to that on the fresh film. Fresh films of the same thickness of ordinary chlorinated rubber, on the other hand, will not withstand any folding in the Schopper tester except with very high viscosities. One sample of ordinary chlorinated rubber having a viscosity of 5,000 centipoises showed an initial Schopper fold test of 11 folds but after aging of the film for 81 days it showed no Schopper folds.

To illustrate my invention further, I give below examples of methods of carrying out my invention.

*Example I*

Thin-sheet crepe rubber cut into slices is placed in a pressure vessel with sufficient 3 per cent by weight caustic soda solution to cover the rubber and the mixture heated at a temperature of approximately 192° C. for about 3.5 hours. The digested rubber is then cooled, washed with water at a temperature of about 65–70° C. in a rubber washer and dried in the same equipment by heating the rolls of the rubber washer and the vessel itself with steam. When sufficiently dry the rubber is cooled before discharging. The dried digested rubber prepared as above will have a viscosity of about 65 to about 160 seconds Cochius. The dried, digested rubber is then dissolved in carbon tetrachloride to give a 5 per cent solution and chlorine gas passed into the solution until the chlorinated digested rubber contains about 67 per cent chlorine. The chlorinated rubber is then recovered by evaporation of the solvent from hot water and the solid chlorinated digested rubber freed from water by centrifuging and drying in a dryer at a temperature of up to about 140° C. The chlorinated digested rubber with a viscosity of 372 centipoises has a film flexibility of 9 Schopper folds. In a 20 per cent solution in toluene it has a solution color of less than 2.5 on the Hellige varnish scale.

*Example II*

Five parts by weight of crepe rubber in thin sheets are covered with 18 parts by weight of 2 per cent caustic soda solution in a pressure vessel and the mixture heated at a temperature of about 231° C. for about 2 hours. The digested rubber is then cooled, washed on a corrugated two-roll mill under a water spray at about 60° C., then dried by heating the rolls with steam. The dry digested rubber having a viscosity of 9 seconds Cochius is dissolved in carbon tetrachloride to give a 4.5 per cent solution and chlorine gas passed into the solution to give a chlorinated rubber containing about 68 per cent chlorine. The solid chlorinated digested rubber is then recovered as in Example I. Having a viscosity of 135 centipoises, a fresh film of 3 mils thickness has a Schopper fold value of 8. This flexibility is retained on aging for long periods.

*Example III*

Thin sheet-crepe rubber cut into slices is covered with 2 per cent caustic soda solution and the mixture heated at a temperature of about 148° C. for about 8 hours. The digested rubber is then cooled, washed and dried as in Example II, and chlorinated in a 5 per cent carbon tetrachloride solution to give a chlorinated digested rubber having a chlorine content of about 69 per cent. The solid chlorinated digested rubber is then recovered as in Example I. Having a viscosity of 238 centipoises, a fresh film has a Schopper fold value of 2 folds.

*Example IV*

Smoked sheet rubber reduced to thin sheets is covered with 2 per cent caustic soda solution and the mixture heated at a temperature of about 198° C. for about 3.5 hours. The digested rubber is then cooled, washed and dried as in Example II, to give a digested rubber having a viscosity of 68 seconds Cochius. The digested rubber is chlorinated in a 5 per cent carbon tetrachloride solution to give a chlorinated rubber having a chlorine content of about 68% and a viscosity of 113 centipoises. A fresh film has a flexibility characterized by a Schopper folding value of about 6 folds. The flexibility is retained on aging.

The improved chlorinated rubber produced in accordance with this invention will be especially desirable for use in coating compositions such as lacquers, paints and varnishes, molding compositions, etc.

It will be understood that the invention is not limited to the amounts or procedures disclosed in the examples for purposes of illustration but that variations of these insofar as they produce a chlorinated rubber capable of producing films of high flexibility not lost on aging are included within the scope of the invention.

This application is filed as a continuation-in-part of the application filed by me May 19, 1936, Serial No. 80,558.

What I claim and desire to protect by Letters Patent is:

1. The method of producing chlorinated rubber containing about 62 to about 70 per cent chlorine and characterized by high permanent flexibility when in the form of an unplasticized film which includes the steps of digesting rubber with an alkaline alkali metal compound, interrupting the digestion process so as to give a digested rubber which after subsequent washing will have a Cochius viscosity in a 5% carbon tetrachloride solution at 20° C. of about 20 to about 200 seconds, washing the digested rubber to remove soluble digestion products and chlorinating the digested rubber in a suitable solvent to a chlorine content of about 62 to about 70 per cent.

2. The method of producing chlorinated rubber containing about 62 to about 70 per cent chlorine and characterized by high permanent flexibility when in the form of an unplasticized film which includes the steps of digesting rubber with an aqueous solution of an alkaline alkali metal compound, interrupting the digestion process so as to give a digested rubber which after subsequent washing will have a Cochius viscosity in a 5% carbon tetrachloride solution at 20° C. of about 20 to about 200 seconds, washing the digested rubber with water to remove soluble digestion products, drying the digested rubber, dissolving the digested rubber in a suitable solvent and chlorinating the digested rubber to a chlorine content of about 62 to about 70 per cent.

3. The method of producing chlorinated rubber containing about 62 to about 70 per cent chlorine and characterized by high permanent flexibility when in the form of an unplasticized film which includes the steps of digesting rubber with an aqueous caustic soda solution containing about 2 to about 15 per cent caustic soda, interrupting the digestion process so as to give a digested rubber which after subsequent washing will have a Cochius viscosity in a 5% carbon tetrachloride solution at 20° C. of about 20 to about 200 seconds, washing the digested rubber with water to remove soluble digestion products, drying the digested rubber, dissolving the digested rubber in a suitable solvent and chlorinating the digested rubber to a chlorine content of about 62 to about 70 per cent.

4. A chlorinated rubber substantially identical with the product produced by the method of claim 1 having a chlorine content of about 62 to about 70 per cent and characterized by high permanent flexibility when in the form of an unplasticized film.

5. A chlorinated rubber substantially identical with the product produced by the method of claim 1 having a chlorine content of about 62 to about 70 per cent and characterized by high permanent flexibility when in the form of an unplasticized film and by a color not darker than 2.5 on the Hellige varnish scale when in a 20 per cent by weight solution in toluene.

6. A chlorinated rubber substantially identical with the product produced by the method of claim 3 having a chlorine content of about 62 to about 70 per cent and characterized by high permanent flexibility when in the form of an unplasticized film.

7. A chlorinated rubber substantially identical with the product produced by the method of claim 3 having a chlorine content of about 62 to about 70 per cent and characterized by high permanent flexibility when in the form of an unplasticized film and by a color not darker than 2.5 on the Hellige varnish scale when in a 20 per cent by weight solution in toluene.

JOHN MERRIAM PETERSON.